United States Patent
Uppunda et al.

(10) Patent No.: US 10,594,599 B2
(45) Date of Patent: Mar. 17, 2020

(54) FIBRE CHANNEL FABRIC SLOW DRAIN MITIGATION

(71) Applicant: Cisco Technology, Inc., San Jose, CA (US)

(72) Inventors: Kishan Kumar Kotari Uppunda, Bangalore (IN); Karthik Subramani, Karnataka (IN); Venu Gopal Tummala, Karnataka (IN); Jayaprakash Nallapalingu, Bangalore (IN); Sumanth Sindiri, Karnataka (IN); Malipedy Vijaya Kumar, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 6 days.

(21) Appl. No.: 15/248,071

(22) Filed: Aug. 26, 2016

(65) Prior Publication Data
US 2018/0063004 A1 Mar. 1, 2018

(51) Int. Cl.
*H04L 12/703* (2013.01)
*H04L 12/707* (2013.01)
*H04L 12/931* (2013.01)

(52) U.S. Cl.
CPC .............. *H04L 45/28* (2013.01); *H04L 45/22* (2013.01); *H04L 49/357* (2013.01)

(58) Field of Classification Search
CPC ......... H04L 43/0852; H04L 2012/5635; H04L 41/0677; H04L 43/10; H04L 45/125;
(Continued)

(56) References Cited

U.S. PATENT DOCUMENTS

| | | |
|---|---|---|
| 6,360,362 B1 | 3/2002 | Fichtner et al. |
| 8,498,213 B2 | 7/2013 | Gnanasekaran et al. |

(Continued)

FOREIGN PATENT DOCUMENTS

| | | |
|---|---|---|
| CN | 109314545 A | 2/2019 |
| CN | 109644021 A | 4/2019 |

(Continued)

OTHER PUBLICATIONS

Brinkmann, M., "Windows 10 Update Delivery Optimization explained," Windows, dated Aug. 17, 2016, Retrieved from the Internet URL: https://web.archive.org/web/20161110094241/https://www.ghacks.net/2016/08/17/windows-10-update-delivery-optimization/, pp. 1-6.

(Continued)

*Primary Examiner* — Yemane Mesfin
*Assistant Examiner* — Mon Cheri S Davenport
(74) *Attorney, Agent, or Firm* — Edell, Shapiro & Finnan, LLC

(57) ABSTRACT

Presented herein are priority route based techniques for mitigation of slow drain devices in a Fibre Channel (FC) fabric comprising a plurality of FC switches. In accordance with examples presented herein, a first FC switch in a FC fabric receives an indication that a first computing device attached to the FC fabric has entered a slow drain condition. The first FC switch is configured to prepare and install a priority route for packet flows directed to the first computing device.

20 Claims, 5 Drawing Sheets

(58) Field of Classification Search
CPC ....... H04L 45/22; H04L 47/11; H04L 47/125; H04L 49/505; H04L 49/506; H04L 47/2433
See application file for complete search history.

(56) References Cited

U.S. PATENT DOCUMENTS

| | | | |
|---|---|---|---|
| 8,542,583 B2 | 9/2013 | Gnanasekaran et al. | |
| 8,588,075 B2 | 11/2013 | Gnanasekaran et al. | |
| 8,593,964 B1 | 11/2013 | Sinha et al. | |
| 8,593,965 B2 | 11/2013 | Rongong et al. | |
| 8,599,691 B2 | 12/2013 | Gnanasekaran et al. | |
| 8,767,561 B2 | 7/2014 | Gnanasekaran et al. | |
| 8,792,354 B2 | 7/2014 | Gnanasekaran et al. | |
| 8,797,877 B1* | 8/2014 | Perla ...................... | H04L 49/90 370/230 |
| 8,908,525 B2 | 12/2014 | Gnanasekaran et al. | |
| 9,264,889 B2 | 2/2016 | Choi-Grogan et al. | |
| 9,268,555 B2 | 2/2016 | Djabarov et al. | |
| 9,411,574 B2 | 8/2016 | Kostadinov et al. | |
| 9,489,496 B2 | 11/2016 | Wysocki et al. | |
| 9,608,909 B1 | 3/2017 | Bharadwaj et al. | |
| 9,830,141 B2 | 11/2017 | Cairns et al. | |
| 9,916,737 B2 | 3/2018 | Osmon et al. | |
| 9,934,014 B2 | 4/2018 | Diebolt et al. | |
| 10,050,347 B2 | 8/2018 | Wei | |
| 2003/0076263 A1 | 4/2003 | Hassan-Zade et al. | |
| 2004/0159699 A1 | 8/2004 | Nelson et al. | |
| 2005/0108444 A1 | 5/2005 | Flauaus et al. | |
| 2006/0190611 A1 | 8/2006 | Miyazaki et al. | |
| 2007/0051809 A1 | 3/2007 | Takahashi et al. | |
| 2007/0121507 A1* | 5/2007 | Manzalini ............... | H04L 47/10 370/235 |
| 2011/0110232 A1 | 5/2011 | Abraham et al. | |
| 2011/0110381 A1* | 5/2011 | Atkinson ............. | H04L 47/125 370/419 |
| 2012/0014253 A1 | 1/2012 | Rongong et al. | |
| 2012/0094599 A1 | 4/2012 | Takeyama | |
| 2013/0260680 A1 | 10/2013 | Tsai | |
| 2013/0309966 A1 | 11/2013 | Aldana et al. | |
| 2013/0343186 A1 | 12/2013 | Gnanasekaran et al. | |
| 2014/0056147 A1 | 2/2014 | Gnanasekaran et al. | |
| 2014/0086054 A1 | 3/2014 | Rongong et al. | |
| 2014/0148095 A1 | 5/2014 | Smith et al. | |
| 2014/0150056 A1 | 5/2014 | Williams et al. | |
| 2014/0317614 A1 | 10/2014 | Djabarov et al. | |
| 2014/0375481 A1 | 12/2014 | McNicoll | |
| 2015/0048163 A1 | 2/2015 | Senior | |
| 2015/0052512 A1 | 2/2015 | Kostadinov et al. | |
| 2015/0178064 A1 | 6/2015 | Cairns et al. | |
| 2015/0235204 A1 | 8/2015 | Wallner | |
| 2015/0303994 A1 | 10/2015 | Dhayni | |
| 2015/0339649 A1 | 11/2015 | Pi Farias | |
| 2016/0006123 A1 | 1/2016 | Li et al. | |
| 2016/0054989 A1 | 2/2016 | Diebolt et al. | |
| 2016/0111770 A1 | 4/2016 | Choi et al. | |
| 2016/0182127 A1 | 6/2016 | Karandikar et al. | |
| 2016/0218432 A1 | 7/2016 | Pope et al. | |
| 2016/0306616 A1 | 10/2016 | Tomppo | |
| 2016/0323428 A1 | 11/2016 | Kim et al. | |
| 2017/0357961 A1 | 12/2017 | Bidari et al. | |
| 2018/0005224 A1 | 1/2018 | Binder et al. | |
| 2018/0068300 A1 | 3/2018 | Saeed et al. | |
| 2019/0004785 A1 | 1/2019 | Kelley et al. | |

FOREIGN PATENT DOCUMENTS

| | | |
|---|---|---|
| EP | 1260947 A1 | 11/2002 |
| WO | 2017/214349 A1 | 12/2017 |
| WO | 2018/005468 A1 | 1/2018 |
| WO | 2019/005386 A1 | 1/2019 |

OTHER PUBLICATIONS

"FLEX-M24LR04E 45 mm x 75 mm flexible antenna reference board for the M24LR04E-R Dual Interface EEPROM," St Microelectronics, published Jul. 2, 2012, Retrieved from the Internet URL : http://www.st.com/content/ccc/resource/technical/document/data_brief/2d/55/62/05/58/fd/42/e2/DM00058583.pdf/files/DM00058583.pdf/jcr:content/translations/en.DM00058583.pdf, on Sep. 26, 2017, pp. 1-3.

Negron, J., "[Technical Blueprint] Windows 10 Co-Management with SCCM & Workspace ONE," VMware End-User Computing Blog, dated Apr. 16, 2018, Retrieved from the Internet URL: http://aponewsletter.blogspot.com/2018/04/technical-blueprint-windows-10-co.html, pp. 1-9.

"Software Update Server," Technology Brief, Retrieved from the Internet URL: https://www.apple.com/server/docs/Software_Update_Server_TB_v10.4.pdf, pp. 1-3 (Jun. 16, 2005).

Non-Final Office Action dated Apr. 19, 2018, for U.S. Appl. No. 15/176,589, of Bidari, E., et al., filed Jun. 8, 2016.

Non-Final Office Action dated Jul. 25, 2018, for U.S. Appl. No. 15/636,356, of Kelley, J., et al., filed Jun. 28, 2017.

International Search Report and Written Opinion for International Application No. PCT/US2016/050036, dated Nov. 29, 2016.

International Search Report and Written Opinion for International Application No. PCT/US2017/039466, dated Oct. 5, 2017.

International Search Report and Written Opinion for International Application No. PCT/US2017/036473, dated Oct. 13, 2017.

International Search Report and Written Opinion for International Application No. PCT/US2018/034773, dated Aug. 10, 2018.

Final Office Action dated Oct. 25, 2018, for U.S. Appl. No. 15/176,589, of of Bidari, E., et al., filed Jun. 8, 2016.

Final Office Action dated Jan. 4, 2019, for U.S. Appl. No. 15/636,356, of Kelley, J., et al., filed Jun. 28, 2017.

Advisory Action dated Jan. 7, 2019, for U.S. Appl. No. 15/176,589, of Bidari, E., et al., filed Jun. 8, 2016.

Notice of Allowance dated Jan. 18, 2019, for U.S. Appl. No. 15/197,720, of Binder, J., et al., filed Jun. 29, 2016.

Non-Final Office Action dated Jun. 24, 2019, for U.S. Appl. No. 16/397,836, of Binder, J., et al., filed Apr. 29, 2019.

Non-Final Office Action dated Jun. 25, 2019, for U.S. Appl. No. 15/721,663, of Gallinghouse, D., et al., filed Sep. 29, 2017.

Non-Final Office Action dated Jun. 28, 2019, for U.S. Appl. No. 15/176,589, of Bidari, E., et al., filed Jun. 8, 2016.

Non-Final Office Action dated Jul. 15, 2019, for U.S. Appl. No. 15/636,356, of Kelley, J., et al., filed Jun. 28, 2017.

Non-Final Office Action dated Mar. 14, 2019 for U.S. Appl. No. 15/636,356, of Kelley, J. filed Jun. 28, 2017.

* cited by examiner

FIBRE CHANNEL FABRIC SLOW DRAIN MITIGATION

TECHNICAL FIELD

The present disclosure relates to Fibre (Fiber) Channel fabrics.

BACKGROUND

The Fibre (Fiber) Channel (FC) standard addresses the general need in networking for fast transfers of large amounts of information. FC networks utilize an arrangement of switches, referred to as an FC fabric, to connect various computing devices (e.g., storage arrays, servers, etc.). This approach simplifies the overhead associated with network traffic, since computing devices with FC ports only manage a point to-point connection between those FC ports and the FC fabric.

DESCRIPTION OF EXAMPLE EMBODIMENTS

Overview

Presented herein are priority route based techniques for mitigation of slow drain devices in a Fibre Channel (FC) fabric that comprises a plurality of FC switches. In accordance with examples presented herein, a first FC switch in a FC fabric receives an indication that a first computing device attached to the FC fabric has entered a slow drain condition. The first FC switch is configured to prepare and install a priority route for packet flows directed to the first computing device.

Example Embodiments

Figure 1:
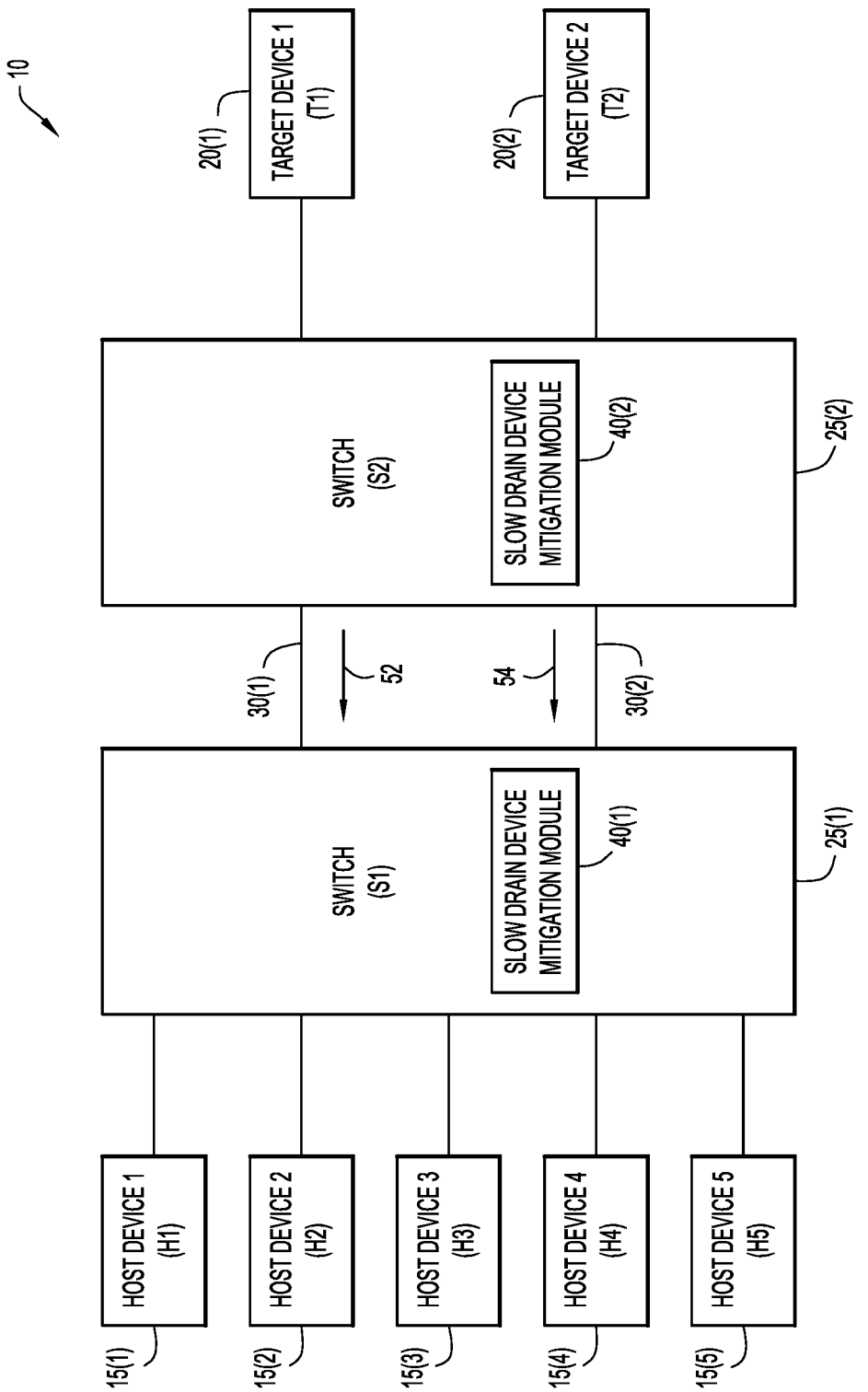
FIG. 1 is a block diagram illustrating a Fibre Channel (FC) network in which the slow drain mitigation techniques presented herein may be implemented, according to an example embodiment.

FIG. 1 is a simplified block diagram of an example Fibre Channel (FC) network 10 in which techniques presented herein may be implemented. Shown in FIG. 1 are five FC host devices (hosts) 15(1)-15(5), two FC target devices (targets) 20(1) and 20(2), and two FC switches 25(1) and 25(2). The FC switches 25(1) and 25(2) collectively form an FC fabric 50 that interconnects the host devices with the target devices. That is, the host devices 15(1)-15(5) and the target devices 20(1)-20(2) are attached to the FC fabric 50 for communication with one another.

The FC fabric 50 includes one or more Inter-Switch Links (ISLs) extending between the FC switches 25(1) and 25(2). For ease of illustration, only two Inter-Switch Links, referred to herein as Inter-Switch Links 30(1) and 30(2), are shown in FIG. 1. However, it is to be appreciated that more or less than two Inter-Switch Links may be present between FC switches in FC fabrics in which the techniques presented herein are implemented. Switches 25(1) and 25(2) also comprise slow drain device mitigation modules 40(1) and 40(2), respectively, that are configured to implement the techniques presented herein to mitigate the affects of slow drain devices on unrelated devices.

In one specific example of FIG. 1, the host devices 15(1)-15(5) are servers and the target devices 20(1)-20(2) are storage area network (SAN) devices. However, it is to be appreciated that the techniques presented herein may be implemented in other arrangements that include, for example, different numbers of FC switches, different numbers or types of computing devices, etc.

An FC network, such as network 10, is a no-drop network that operates on a credit-based flow control mechanism for communication between any pair of ports. A buffer-to-buffer ("B2B") credit number for a peer port tracks the number of packet buffers available on a peer port for packet transmission toward that port. As such, an FC packet may be transmitted by a port only if it has B2B credit at the peer port that is greater than zero. In operation, a packet transmitted from a port decrements its associated B2B credit counter. An acknowledgement of completion of processing of a packet takes the form of a Receiver Ready ("R_RDY") primitive signal from the peer port, which increments the B2B credit counter. That is, the R_DY primitive signal is used to inform the transmitter that a new buffer has become available at the receiver. The R_RDY primitive only contains information indicating that a buffer is available at the port sending the R_RDY and, in general, no other information (i.e., information indicating that a new buffer available for a link).

Virtual linking is a mechanism in certain FC switches where the interface credits are carved per virtual link (VL) and flow control is managed by Extended RRDY (ER_RDY), which works at a VL level. The ER_RDY primitive is a Cisco® proprietary FCMAC IP implementation, which is used as an alternative to R_RDY. Cisco® is a registered trademark of Cisco Systems, Inc. In general, the ER_RDY primitive divides the physical link into multiple priority/virtual links (VLs). VLs are individually credited and flow controlled and ER_RDY carries credit information on a per VL basis.

A "slow drain device" is a device that is draining packets slower than its link speed (i.e. is in a slow drain condition). That is, a device in a slow drain condition does not accept frames at the rate generated by a source (i.e., the R_RDY signals are delayed in response to the frames). A "stuck device" is a device is an example of a severe slow drain condition where the device completely stops accepting frames from a source (i.e., the R_RDY signals are not returned in response to frames). This can lead to a head of line (HOL) blocking, when multiple flows (e.g., several good flows and a slow flow) share the same ISL link. The slow flow could use the entire link credits, thus causing other good flows to slow down, thereby causing link underutilization. As used herein, a "slow drain device" (i.e., a device in a slow drain condition) includes both slow drain and stuck devices.

A slow drain condition can arise as a result of a number of different issues, such as problems in the device Operating System ("OS") or host bus adapters ("HBAs"), storage issues, switch misconfigurations (e.g., speed mismatches), application issues, etc. Many slow drain device conditions are due to devices being overwhelmed by large chunks of data being received from a storage device. This may be particularly prevalent in large SAN installations (e.g., 25-30 slow drain devices per day).

In the presence of slow drain devices, FC networks are likely to run out of switch packet buffers, resulting in switch port credit starvation and potential choking of Inter-Switch Links. Due to head-of-line blocking, an Inter-Switch Link running out of B2B credits results in traffic flows that are unrelated to the slow drain device being impacted. That is, in a FC network, the Inter-Switch Links (i.e., ISL ports) are shared to carry traffic for multiple flows with different source identifiers (SIDs) and destination identifiers (DIDs) (i.e., different SID-DID flows) and, as a result, slowness in one device in the network can impact other devices in the network, even if those devices do not communicate with the slow drain device.

For example, referring specifically to the arrangement of FIG. 1, all of the traffic between the host devices 15(1)-15(5) and the target devices 20(1) and 20(2) passes, in either direction, over the Inter-Switch Links 30(1) and 30(2) (i.e., the links between the two switches in the fabric). This is a typical scenario in a core-edge topology.

A problem may arise where the target device 20(2) reaches a point where its ingress queue is filled, meaning that the ingress queue of target device 20(2) is unable to send R_RDY signals (i.e., T2's transmission B2B=0). In other words, the target device 20(2) enters a slow drain condition and, accordingly, is referred to as slow drain device. As noted, the slowness of target device 20(2) can impact the traffic running between other devices in the FC fabric 50 which share the Inter-Switch Links 30(1) and 30(2). Presented herein are techniques to mitigate the affect that a slow drain device has on other devices in a network using priority routing for the flows from the slow drain device. As described further below, the techniques presented herein have two primary aspects, namely the propagation of information about the slow drain device across the FC fabric, and subsequently mitigating the impact of the slow drain device via priority routing.

Referring first to the propagation of slow drain information, certain FC switches include mechanisms (e.g., hardware and/or software mechanisms) for identifying slow drain devices. Such mechanisms may include, for example, tracking an amount of time spent waiting for credits (B2B=0) on a port with a configurable timeout threshold (e.g., 100 milliseconds (ms)). Employing this specific mechanism, once the wait time for a frame on a port exceeds the designated threshold, the connected device is deemed to be a slow drain device (or stuck). Once the slow drain device is identified, the techniques presented herein use, for example, the Name Server infrastructure to propagate this information to all other switches in the fabric.

Slow drain device information may include, for example, a list of slow drain devices (i.e., one or more devices determined to be experiencing a slow drain condition) and/or a list of devices that have transitioned from a slow drain condition within a previous time period. There are, in general, two scenarios for distribution of slow drain device information, which include use of a Switch Internal Link Services (SW_ILS) command or use of the Name Server infrastructure. The SW-ILS command is used when a slow drain condition is detected and this condition same has to be communicated to the fabric, whereas the Name Server distribution is utilized when a new switch joins the fabric (i.e., to inform the new switch of the existing slow drain condition). For example, when a new domain joins an FC fabric to which a slow drain device is already connected (i.e., a slow drain condition already exists in the fabric), the slow drain device information may be carried within the get entries based on port type (GE_PT) payload. Typically GE_PT pulls information about the details of all the devices connected to a domain, but there are available bits in the device information field. The techniques presented herein may make use of these available bits in the device information field of the GE_PT payload to indicate that a particular device is experiencing a slow drain condition. As such, both the SW-ILS command and the Name Server mechanisms are utilized within the fabric for slow drain information, but each is used under different circumstances.

Once the information about the slow drain device is distributed to all the domains in the fabric, FC switches directly connected to devices zoned with (i.e., communicating with) the slow drain device are configured to install a priority static route (priority route) for the slow drain device. Similarly whenever a device comes out of the slow drain condition, the FC switches directly connected to devices zoned with the slow drain device are informed using the same mechanism and are configured to remove/uninstall the priority route (i.e., communication is restored to normal).

In certain arrangements, some of the switches in a fabric may not support zoning or other features. Therefore, in certain examples, the priority routes can be installed on all the supported switches in the fabric without applying any zoning rules. This enables congestion prevention wherever possible in case of mixed topologies.

More specifically, FC forwarding has a concept of priority for each route which acts like a weight. Whenever multiple routes are available for the same destination, the priority route will be used for forwarding and other routes would be ignored. Devices generally have an associated default route which is based on a Fabric Shortest Path First (FSPF) route computation. However, this route can be overridden with a priority route which, once installed, will take precedence over the predetermined FSPF routes. That is, the installed priority route will be selected over the predetermined FSPF routes.

In an FC fabric, routes have a rewrite adjacency field where the desired fields can be overwritten once the destination interface is derived. In accordance the techniques presented herein, a rewrite adjacency for the priority route is provided, where the priority field will be overwritten with the desired priority which will be later used to decide the Virtual Link (VL) for the flows destined to the slow drain device. This priority overrides the access control list (ACL) driven priority also if at all zone quality of service (QoS) is in place. As noted above, in certain examples in which the priority field is preserved over trunked ISL links, the priority route is installed only on the edge switch (i.e., the priority route is required only on the edge switches, and is not required on other hops along the path). However, in other examples where one or more switches do not preserve priority over trunked ISL links, the priority route is installed on all switches in the fabric.

As noted, when a device comes out of a slow drain condition, the priority route would be restored to normal level (i.e., back to the FSPF selected route) and the traffic would resume on the FSPF route. Also as noted, certain FC switches utilize a mechanism where the interface credits are carved per VL and flow control is managed by ER_RDY. Using ER_RDY, a slow flow can be routed to a specified VL (called a low priority VL) such that other good/normal flows will not be affected by the slow device. That is, in accordance with examples presented herein, the slow drain device mitigation techniques allocate fewer buffers for a VL which will be used for slow drain flows. In this way, slow drain devices would be starved more, but won't affect other flows. Installed priority route would make sure traffic towards slow drain device would be flowing through this lower priority VL.

Figure 2:
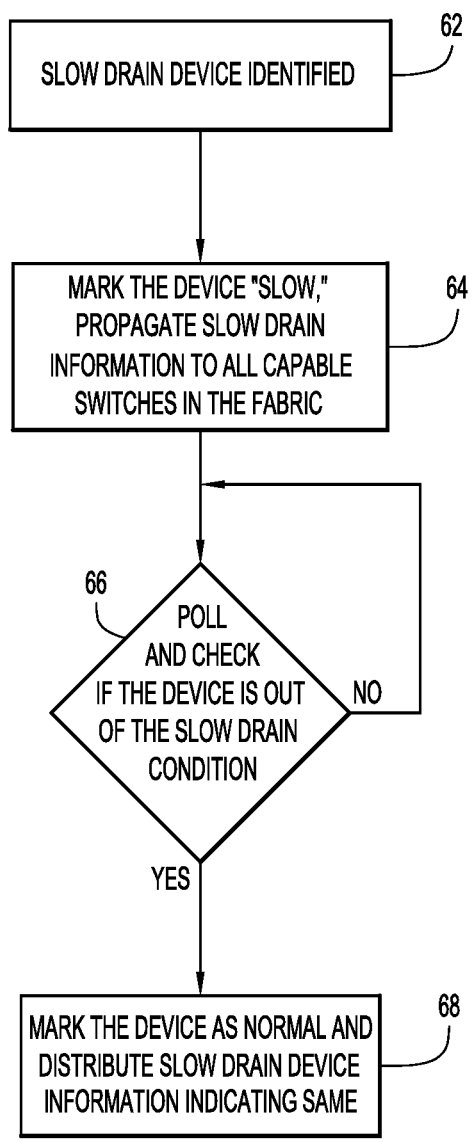
FIG. 2 is a flowchart illustrating operations performed by a source FC switch, according to an example embodiment.

FIG. 2 is a flowchart of a method 60 performed at a source FC switch to mitigate the affect of a slow drain device in accordance with embodiments presented herein. As used herein, a "source" FC switch is an edge switch that is directly connected to a computing device that has entered a slow device condition. For ease of illustration, method 60 is described with reference to FC network 10 of FIG. 1 where, as noted above, target device 20(2) is a slow drain device. Since the target device 20(2) is the slow drain device, the closest FC switch 25(2) is referred to herein as the source switch.

Method 60 begins at 62 where the FC switch 25(2) identifies the target device 20(2) as a slow drain device using, for example, one of the mechanisms described above. At 64, the FC switch 25(2) marks the target device 20(2) as "slow" and propagates this slow drain device information to other switches in the FC fabric (e.g., FC switch 25(1)). In one example, the FC switch 25(2) marks the target device 20(2) as slow by adding the device to a list of determined slow drain devices. The slow drain device information may then be propagated using one of the mechanisms described above and this propagation is generally represented in FIG. 1 by arrow 52 and is sometimes referred to herein as a slow drain device notification.

At 66, the FC switch 25(2) polls the target device 20(2) to determine whether the target device 20(2) remains in a slow drain device condition. If the target device 20(2) remains in a slow drain device condition, the FC switch 25(2) will wait a period of time and re-poll the target device 20(2). This continues until the FC switch 25(2) determines that the target device 20(2) is no longer in a slow drain condition. In one example, the FC switch 25(2) polls the target device 20(2) as described above (e.g., tracking an amount of time spent waiting for credits (B2B=0) on a port with a configurable timeout threshold). However, the criteria (e.g., configurable timeout threshold) used to determine that the device has transitioned out of slow drain condition may be different (e.g., doubled) and can be tuned as per a selected configuration.

Once the FC switch 25(2) determines that the target device 20(2) is no longer in a slow drain condition, method 60 proceeds to 68 where the FC switch 25(2) marks the target device 20(2) as "normal." The FC switch 25(2) then propagates additional slow drain device information to other switches in the FC fabric (e.g., to FC switch 25(1)) using the SW_ILS (e.g., SW_ILS 0x73 will carry the information of all the devices moving back to normal mode). The 0x73 is a Cisco® vendor specific SW_ILS command. Cisco® is a registered trademark of Cisco Systems, Inc. This additional slow drain device information is represented in FIG. 1 by arrow 54 which, as noted, is sometimes referred to herein as a slow drain device notification.

Figure 3:
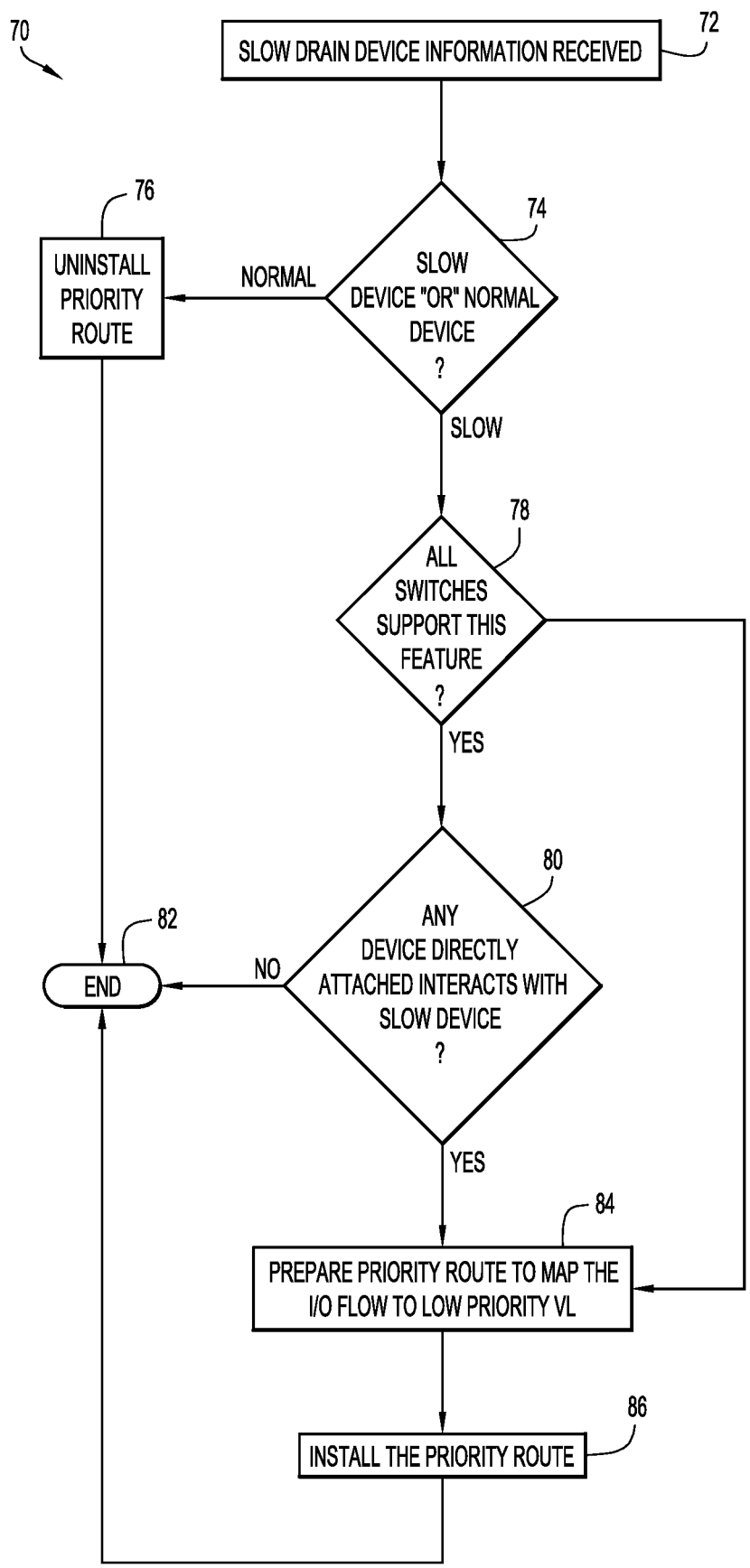
FIG. 3 is a flowchart illustrating operations performed by a recipient FC switch, according to an example embodiment.

FIG. 3 is a flowchart of a method 70 performed at a recipient FC switch to mitigate the affect of a slow drain device in accordance with embodiments presented herein. As used herein, a "recipient" FC switch may be a switch that is not directly connected to a computing device that has entered a slow device condition. For ease of illustration, method 70 is described with reference to FC network 10 of FIG. 1 and method 60 of FIG. 2 where, as noted, target device 20(2) is a slow drain device. Since the target device 20(2) is the slow drain device, FC switch 25(1) is referred to herein as the "recipient" switch.

Method 70 begins at 72 where the FC switch 25(1) receives slow drain device information (e.g., a slow drain device notification 52 or 54) from source FC switch 25(2). At 74, the FC switch 25(1) determines whether the slow drain device information indicates that an identified device has entered a slow drain device condition or that a previously-identified slow drain device has returned to normal operation (i.e., no longer slow draining). If it is determined at 74 that a previously-identified slow drain device has returned to normal operation, then FC switch 25(1) uninstalls a priority route that, as described further below, was previously prepared and installed for the identified device.

If, at 74, the FC switch 25(1) determines that the slow drain device information indicates that an identified device has entered a slow drain condition, then at 78 the FC switch 25(1) determines whether all switches support the ability to perform slow device mitigation. As noted elsewhere herein, not all of the switches in a fabric may run the firmware which has this slow device mitigation feature and/or may not have the hardware support for this feature. If all switches do not support the ability to perform slow device mitigation, then method 70 proceeds to 84, which will be described greater below. However, if all switches do support the ability to perform slow device mitigation, then a determination is made at 80 whether any directly attached computing device interacts with the slow drain device (i.e., with target device 20(2)). If no attached device interacts with the slow drain device, then the method 70 ends at 82 without performing any additional operations.

Returning to 80, if FC switch 25(1) determines that one or more devices directly attached to the FC switch interacts with the slow drain device 20(2), then at 84 the FC switch 25(1) prepares a priority route for the slow drain device 20(2) in order to map the input/output flow to a low-priority VL. The FC switch 25(1) prepares a priority route by identifying a slow VL (i.e., a VL associated with the slow drain device 20(2)), allocating a rewrite adjacency entry, and passing this entry to the hardware. The operations at 84 are also executed when, as noted above, the FC switch 25(1) determines that all switches support the ability to perform slow device mitigation. After preparation of the priority route at 84, the FC switch 25(1) installs the priority route and the method 70 ends at 82.

Figure 4:
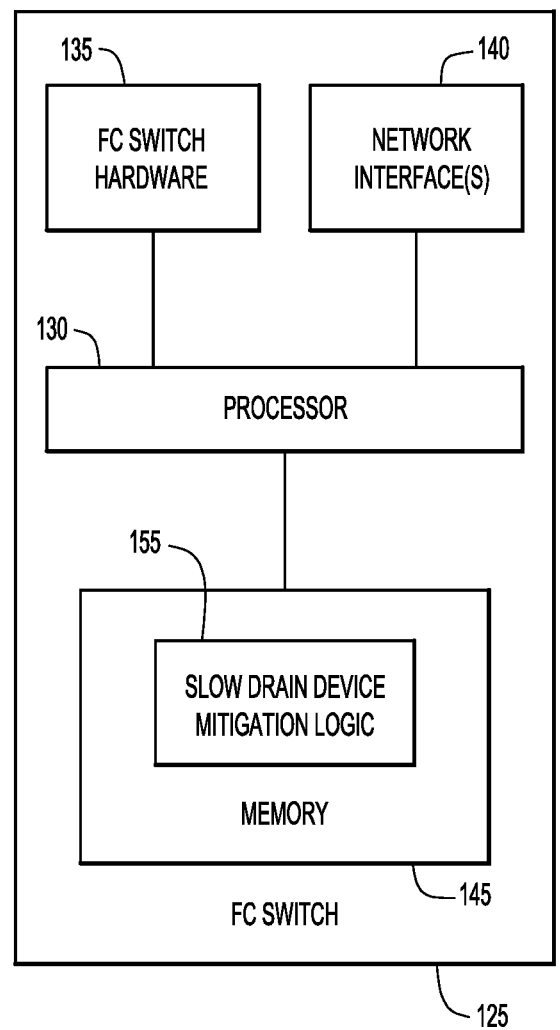
FIG. 4 is a block diagram of a FC switch configured to execute the slow drain mitigation techniques presented herein, according to an example embodiment.

In summary, FIGS. 1, 2, and 3 illustrate details of priority route based techniques for mitigation of slow drain devices in an FC fabric. As noted, in the techniques presented herein, information about slow drain devices is communicated throughout the FC fabric using, for example, the Name Server infrastructure and priority route can be installed to handle the slow drain device. FIG. 4 is a block diagram illustrating one implementation of an FC switch 125 configured to perform the priority route based slow drain device mitigation techniques presented herein. FC switch 125 comprises a processor 130, FC switch hardware 135, network interface(s) 140 and a memory 145. The memory 145 includes slow drain device mitigation logic 155. As noted above, different devices connected to an FC fabric can enter a slow drain condition (i.e., become a slow drain device). As a result, an FC switch, such as FC switch 125, may be one or both of a source switch and a recipient switch with respect to a particular slow drain device. Therefore, the slow drain device mitigation logic 155 can be executed to perform the operations of a source switch (i.e., perform the operations of FIG. 2) or the operations of a recipient switch ((i.e., perform the operations of FIG. 3).

The memory 145 may be read only memory (ROM), random access memory (RAM), magnetic disk storage media devices, optical storage media devices, flash memory devices, electrical, optical, or other physical/tangible memory storage devices. Thus, in general, the memory 145 may comprise one or more tangible (non-transitory) computer readable storage media (e.g., a memory device) encoded with software comprising computer executable instructions and when the software is executed (by the processor 130) it is operable to perform the operations described herein. In other words, the FC switch 125 performs the operations described above in connection with FIGS. 1, 2, and/or 3 when executing the software stored in memory 145.

The FC switch hardware 135 comprises digital logic and other circuitry configured to perform the FC switching operations in an FC fabric. The FC switch hardware 135 may be implemented by one or more application specific integrated circuits (ASICs). The network interface(s) 140 include suitable FC interfaces, such as ports, for connection to an FC network and also to any other network for control/command functions associated with FC switch 125.

Figure 5:
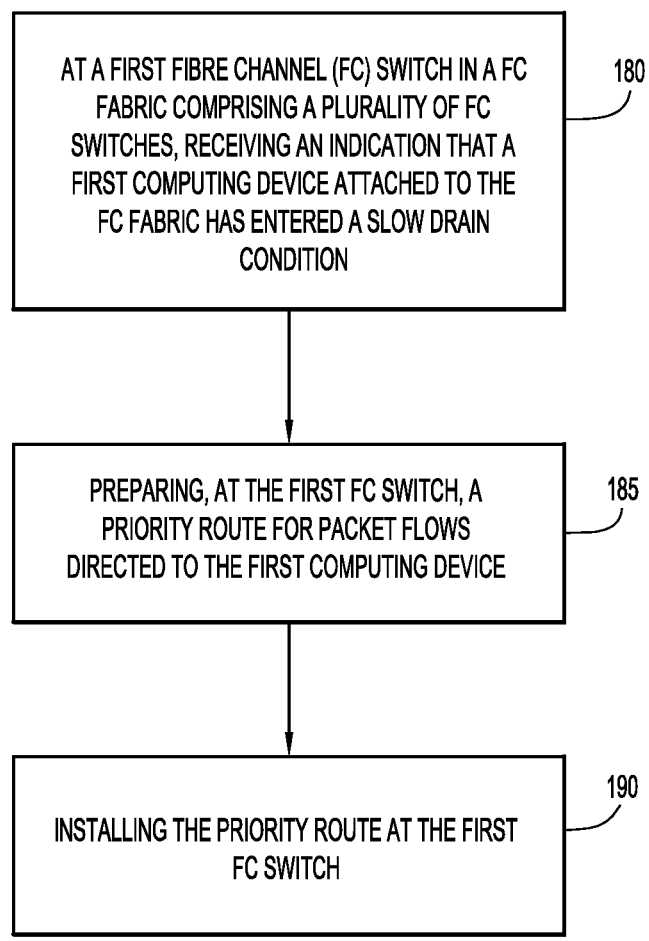
FIG. 5 is a high level flowchart illustrating operations performed by an FC switch, according to an example embodiment.

FIG. 5 is a high level flowchart illustrating a method 175 in accordance with examples presented herein. Method 175 begins at 180 where a first FC switch in an FC fabric receives an indication that a first computing device attached to the FC fabric has entered a slow drain condition. At 185, the first FC switch prepares a priority route for packet flows directed to the first computing device. At 190, the priority route is installed at the first FC switch.

As noted above, the techniques presented herein include two primary aspects, namely propagation of slow drain device information though an FC fabric and programming the hardware to divert traffic to a slow drain device to a priority route. In certain examples, the slow drain device information may be propagated using the Name Server infrastructure, which has a relatively quick convergence then other types of communications, such as Zone Server communications, particularly in large customer deployments where the zone configuration may be extensive. In addition, a slow drain device may be identified when a zone change is already in progress. As such, there could be a deadlock situation if multiple switches try to initiate the distribution of slow drain information. The use of Name Server infrastructure to distribute slow drain device information is advantageous in such scenarios since the Name Server infrastructure has the ability to handle these events independently. In one example of the techniques presented herein, an FC switch can install one entry for a slow drain device independent of the number of devices with which it is zoned. The read-write adjacency can be in an ACL, but the number of entries to be reprogrammed will be directly proportional to the number of members zoned with the slow drain device.

In one form, the techniques presented herein provide a computer-implemented method of, at a first Fibre Channel (FC) switch in a FC fabric comprising a plurality of FC switches, receiving an indication that a first computing device attached to the FC fabric has entered a slow drain condition; preparing, at the first FC switch, a priority route for packet flows directed to the first computing device; and installing the priority route at the first FC switch.

In another form, an apparatus is provided. The apparatus comprises one or more network interfaces configured for communication over a Fibre Channel (FC) comprising a plurality of FC switches, a memory, and a processor. The processor is configured to determine, based on a received indication, that a first computing device attached to the FC fabric has entered a slow drain condition, prepare a priority route for packet flows directed to the first computing device, and install the priority route at the apparatus.

In another form, one or more non-transitory computer readable storage media are provided. The computer readable storage media being encoded with software comprising computer executable instructions, and when the software is executed, operable to: at a first Fibre Channel (FC) switch in a FC fabric comprising a plurality of FC switches, receive an indication that a first computing device attached to the FC fabric has entered a slow drain condition; prepare, at the first FC switch, a priority route for packet flows directed to the first computing device; and install the priority route at the first FC switch.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a first Fibre Channel (FC) switch in a FC fabric comprising a plurality of FC switches, receiving an indication that a first computing device attached to the FC fabric has entered a slow drain condition;
   after receiving the indication that the first computing device has entered the slow drain condition, determining, at the first FC switch, a priority route for packet flows directed to the first computing device, wherein the priority route maps the packet flows directed to the first computing device to a dedicated virtual link to carry packets to the first computing device and the dedicated virtual link has a low priority to carry the packets directed to the first computing device so as to mitigate one or more effects of the slow drain condition of the first computing device on one or more other devices attached to the FC fabric, wherein the determining comprises allocating a rewrite adjacency entry to the first computing device for a rewrite adjacency field for the priority route; and
   installing the priority route at the first FC switch, wherein the priority route overrides a default route associated with the first computing device.

2. The method of claim 1, further comprising:
   receiving, at the first FC switch, an indication that the first computing device has resumed normal operation and is no longer in the slow drain condition; and
   uninstalling the priority route at the first FC switch.

3. The method of claim 1, further comprising:
   prior to determining the priority route for the packet flows directed to the first computing device, determining whether any computing device directly attached to the first FC switch communicates with the first computing device,
   wherein no priority route is determined or installed if no computing device directly attached to the first FC switch communicates with the first computing device.

4. The method of claim 1, wherein receiving an indication that the first computing device attached to the FC fabric has entered the slow drain condition comprises:
   receiving a Switch Internal Link Services (SW_ILS) command identifying the first computing device.

5. The method of claim 1, wherein receiving an indication that the first computing device attached to the FC fabric has entered the slow drain condition comprises:

receiving a get entries based on port type (GE_PT) message, wherein the GE_PT message includes a device information field that is modified to identify the first computing device and to indicate that the first computing device has entered the slow drain condition.

6. The method of claim 1, further comprising:
detecting, at a second FC switch in the FC fabric, that the first computing device has entered the slow drain condition; and
communicating, by the second FC switch, the indication to the first FC switch that the first computing device attached to the FC fabric has entered a slow drain condition.

7. The method of claim 1, further comprising:
installing the priority route on two or more of the plurality of FC switches in the FC fabric without applying zoning rules.

8. An apparatus, comprising:
one or more network interfaces configured for communication over a Fibre Channel (FC) comprising a plurality of FC switches;
a memory; and
a processor configured to:
determine, based on a received indication, that a first computing device attached to the FC fabric has entered a slow drain condition;
after determining the first computing device has entered the slow drain condition, determine a priority route for packet flows directed to the first computing device, wherein the priority route maps the packet flows directed to the first computing device to a dedicated virtual link to carry packets to the first computing device and the dedicated virtual link has a low priority to carry the packets directed to the first computing device so as to mitigate one or more effects of the slow drain condition of the first computing device on one or more other devices attached to the FC fabric, wherein to determine the priority route for the packet flows comprises allocating a rewrite adjacency entry to the first computing device for a rewrite adjacency field for the priority route; and
install the priority route at the apparatus, wherein the priority route overrides a default route associated with the first computing device.

9. The apparatus of claim 8, wherein the processor is configured to:
determine, based on a received indication, that the first computing device has resumed normal operation and is no longer in the slow drain condition; and
uninstall the priority route.

10. The apparatus of claim 8, wherein prior to determining the priority route for packet flows directed to the first computing device, the processor is configured to:
determine whether any computing device directly attached to the apparatus communicates with the first computing device,
wherein no priority route is determined or installed if no computing device directly attached to the apparatus communicates with the first computing device.

11. The apparatus of claim 8, wherein the processor is configured to determine that the first computing device attached to the FC fabric has entered a slow drain condition based on a received get entries based on port type (GE_PT) message, wherein the GE_PT message includes a device information field that is modified to identify the first computing device and to indicate that the first computing device has entered the slow drain condition.

12. The apparatus of claim 8, wherein the processor is configured to determine that the first computing device attached to the FC fabric has entered a slow drain condition based on a received Switch Internal Link Services (SW_ILS) command identifying the first computing device.

13. One or more non-transitory computer readable storage media being encoded with software comprising computer executable instructions, and when the software is executed, operable to:
at a first Fibre Channel (FC) switch in a FC fabric comprising a plurality of FC switches, receive an indication that a first computing device attached to the FC fabric has entered a slow drain condition;
after receiving the indication that the first computing device has entered the slow drain condition, determine, at the first FC switch, a priority route for packet flows directed to the first computing device, wherein the priority route maps the packet flows directed to the first computing device to a dedicated virtual link to carry packets to the first computing device and the dedicated virtual link has a low priority to carry the packets directed to the first computing device so as to mitigate one or more effects of the slow drain condition of the first computing device on one or more other devices attached to the FC fabric, wherein to determine the priority route for the packet flows comprises allocating a rewrite adjacency entry to the first computing device for a rewrite adjacency field for the priority route; and
install the priority route at the first FC switch, wherein the priority route overrides a default route associated with the first computing device.

14. The non-transitory computer readable storage media of claim 13, further comprising instructions operable to:
determine, based on a received indication, that the first computing device has resumed normal operation and is no longer in the slow drain condition; and
uninstall the priority route the first FC switch.

15. The non-transitory computer readable storage media of claim 13, wherein prior to determining the priority route for the packet flows directed to the first computing device, the non-transitory computer readable storage media further comprises instructions operable to:
determine whether any computing device directly attached to the first FC switch communicates with the first computing device,
wherein no priority route is determined or installed if no computing device directly attached to the first FC switch communicates with the first computing device.

16. The non-transitory computer readable storage media of claim 13, wherein the instructions operable to receive the indication that the first computing device has entered a slow drain condition comprises instructions operable to:
receive a get entries based on port type (GE_PT) message, wherein the GE_PT message includes a device information field that is modified to identify the first computing device and to indicate that the first computing device has entered the slow drain condition.

17. The non-transitory computer readable storage media of claim 13, wherein the instructions operable to receive the indication that the first computing device has entered a slow drain condition comprises instructions operable to:
receive a Switch Internal Link Services (SW_ILS) command identifying the first computing device.

18. The method of claim 1, wherein the low priority of the dedicated virtual link overrides an access control list priority for a zone quality of service.

19. The method of claim 1, further comprising:
   joining the FC fabric by the first FC switch, wherein the indication that the first computing device attached to the FC fabric has entered the slow drain condition is received from a Name Server infrastructure.

20. The non-transitory computer readable storage media of claim 13, wherein the low priority of the dedicated virtual link overrides an access control list priority for a zone quality of service.

* * * * *